United States Patent
Shibata et al.

(10) Patent No.: US 8,050,635 B2
(45) Date of Patent: Nov. 1, 2011

(54) SYSTEMS AND METHODS FOR REDUCING POWER CONSUMPTION IN VEHICLE COMMUNICATION SYSTEMS

(75) Inventors: Hiroaki Shibata, Novi, MI (US); Koji Shinoda, Farmington Hills, MI (US)

(73) Assignees: DENSO International America, Inc., Southfield, MI (US); DENSO Corporation, Kariya (JP)

( * ) Notice: Subject to any disclaimer, the term of this patent is extended or adjusted under 35 U.S.C. 154(b) by 436 days.

(21) Appl. No.: 12/411,192

(22) Filed: Mar. 25, 2009

(65) Prior Publication Data

US 2010/0248636 A1    Sep. 30, 2010

(51) Int. Cl.
*H04B 1/034* (2006.01)
(52) U.S. Cl. .................. 455/99; 455/67.11; 455/90.1
(58) Field of Classification Search ............... 455/67.11, 455/90.1, 99
See application file for complete search history.

(56) References Cited

U.S. PATENT DOCUMENTS

| | | | |
|---|---|---|---|
| 5,799,256 A * | 8/1998 | Pombo et al. ............ | 455/574 |
| 6,185,423 B1 * | 2/2001 | Brown et al. ............ | 455/434 |
| 6,424,837 B1 * | 7/2002 | Hall et al. ............ | 455/456.5 |
| 6,493,546 B2 * | 12/2002 | Patsiokas ............ | 455/277.1 |
| 6,600,922 B1 * | 7/2003 | Aoki ............ | 455/432.1 |
| 6,609,001 B2 * | 8/2003 | Kline et al. ............ | 455/423 |
| 7,373,152 B2 * | 5/2008 | Oesterling ............ | 455/456.1 |
| 2002/0058475 A1 * | 5/2002 | Patsiokas ............ | 455/3.02 |
| 2005/0272482 A1 | 12/2005 | Shinoda | |
| 2007/0207841 A1 * | 9/2007 | Amerga et al. ............ | 455/574 |
| 2010/0157864 A1 * | 6/2010 | Salomone et al. ............ | 370/311 |

FOREIGN PATENT DOCUMENTS

| | | |
|---|---|---|
| JP | 2001-251234 | 9/2001 |
| JP | 2003-187361 | 7/2003 |
| JP | 2006-089020 | 4/2006 |

* cited by examiner

*Primary Examiner* — Lincoln Donovan
*Assistant Examiner* — William Hernandez
(74) *Attorney, Agent, or Firm* — Harness, Dickey & Pierce, PLC (57) ABSTRACT

A vehicle communication system includes a connection quality module and a channel scan frequency module. The connection quality module determines that a vehicle is out-of-range (OOR) from a host when a connection quality between the vehicle and the host is below a predetermined connection quality threshold. The channel scan frequency module controls a frequency of attempts by the vehicle to connect to the host when the vehicle is OOR based on at least one of whether an engine is on and a movement rate of the vehicle.

20 Claims, 6 Drawing Sheets

SYSTEMS AND METHODS FOR REDUCING POWER CONSUMPTION IN VEHICLE COMMUNICATION SYSTEMS

FIELD

The present disclosure relates to vehicle communication systems and more particularly to systems and methods for reducing power consumption in vehicle communication systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
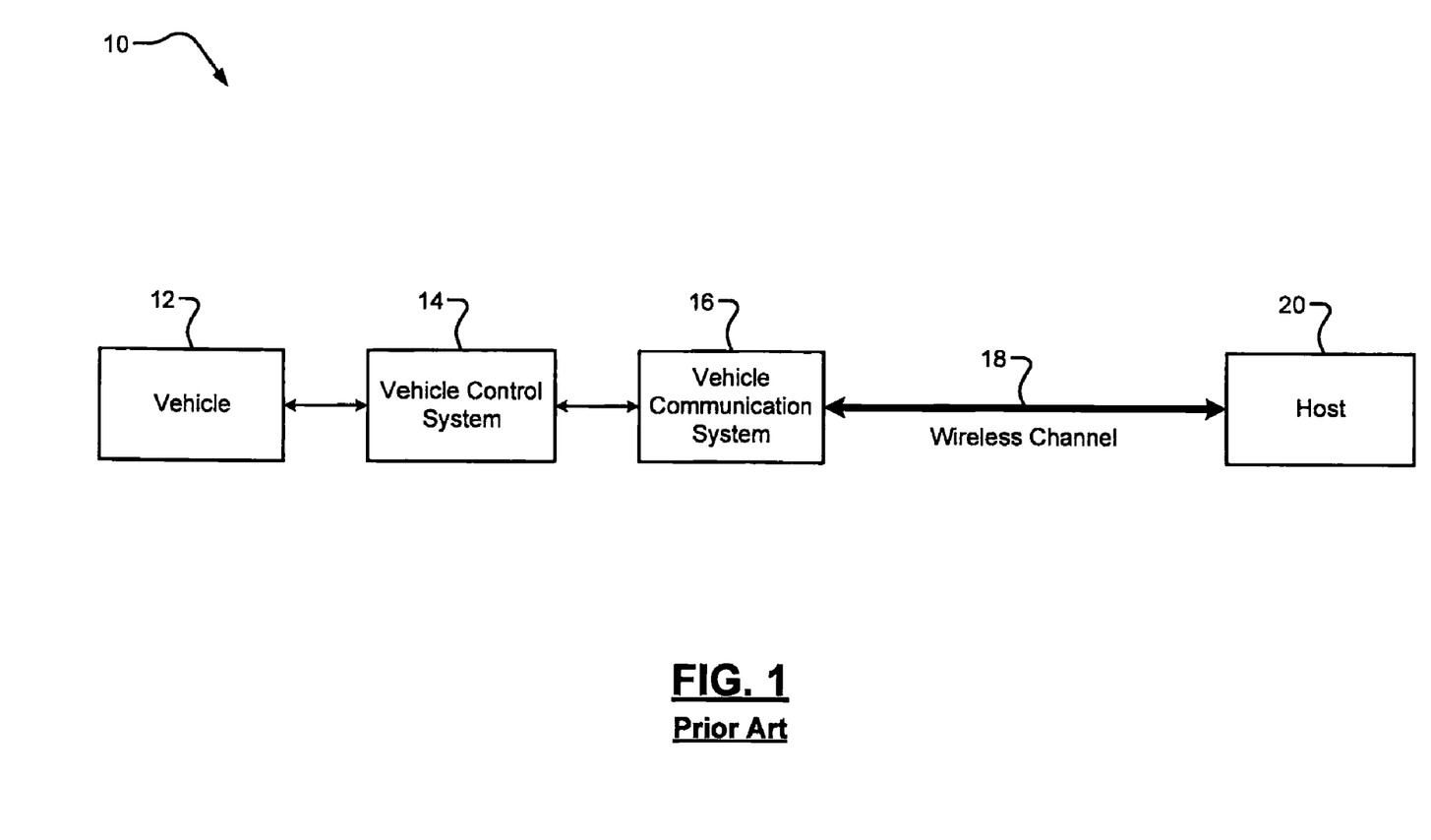
FIG. 1 is a functional block diagram of a vehicle communication system according to the prior art.

Referring now to FIG. 1, a communication system 10 connecting a vehicle 12 and a host 20 is shown. The vehicle 12 communicates with a vehicle control system 14. For example, the vehicle control system 14 may receive sensor data from the vehicle 12 and send control signals to the vehicle 12. For example only, the vehicle control system 14 may send control signals to an engine (not shown) of the vehicle 12. It can be appreciated that while a separate vehicle control system 14 is shown, the vehicle control system 14 may be implemented as part of the vehicle 12.

The vehicle control system 14 communicates with a vehicle communication system 16. For example only, the vehicle communication system 16 may be a global positioning satellite (GPS) system or a telematic system. It can be appreciated that while a separate vehicle communication system 16 is shown, the vehicle communication system 16 may be implemented as part of the vehicle control system 14 and/or the vehicle 12.

The vehicle communication system 16 facilitates communication between the vehicle control system 14 and a host 20 via a wireless communication channel 18. For example only, the vehicle communication system 16 and the host 20 may communicate via radio frequency (RF) communication.

Communication between the vehicle 12 and the host 20 may be for, but not limited to, emergency, security, and/or navigation. For example, during an emergency (e.g. after an accident), an operator of the vehicle 12 may contact an emergency services host 20. For example, an owner of the vehicle 12 may contact a security services host 20 when he/she is locked out of the vehicle 12. For example, the operator of the vehicle 12 may send requests for and/or receive navigational information from a GPS host 20.

SUMMARY

A vehicle communication system includes a connection quality module and a channel scan frequency module. The connection quality module determines that a vehicle is out-of-range (OOR) from a host when a connection quality between the vehicle and the host is below a predetermined connection quality threshold. The channel scan frequency module controls a frequency of attempts by the vehicle to connect to the host when the vehicle is OOR based on at least one of whether an engine is on and a movement rate of the vehicle.

A method for connecting a vehicle to a host includes determining that the vehicle is out-of-range (OOR) from the host when a connection quality between the vehicle and the host is below a predetermined connection quality threshold, and controlling a frequency of attempts by the vehicle to connect to the host when the vehicle is OOR based on at least one of whether an engine is on and a movement rate of the vehicle.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Vehicles connect to hosts via vehicle communication systems. Typical vehicle communication systems may operate continuously under all conditions. In other words, typical vehicle communication systems may operate during engine-off and/or vehicle out-of-range (OOR) events. For example, a vehicle OOR event may be when the vehicle communication system has lost a connection to a host. Therefore, the vehicle communication system may continuously attempt to establish communication with the host during the OOR event.

Large amounts of power may be consumed when continuously attempting to establish communication with the host (i.e. during an OOR event). Furthermore, the vehicle communication system may be powered by a battery during an engine-off event. Therefore, the vehicle communication system may have a limited amount of power available to attempt to establish communication with the host during an engine-off and OOR event. Thus, systems and methods for reducing power consumption in a vehicle communication system are presented.

Figure 2:
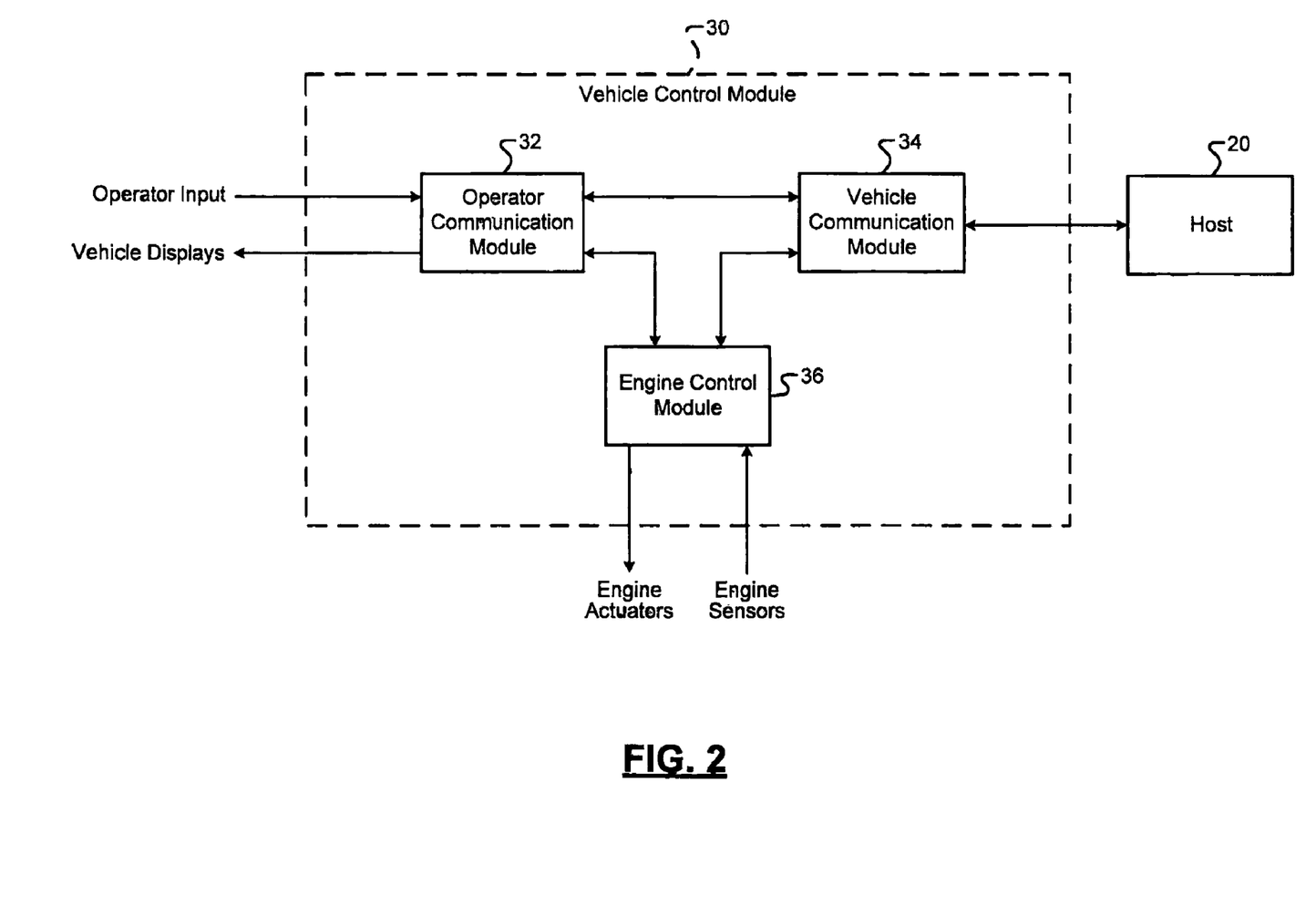
FIG. 2 is a functional block diagram of a vehicle control module according to the present disclosure.

Referring now to FIG. 2, a vehicle control module 30 is shown in more detail. The vehicle control module 30 may include an operator communication module 32, a vehicle communication module 34, and an engine control module 36.

The operator communication module 32 may receive operating input from an operator of the vehicle 12. The operator communication module 32 may send the operating input from the operator to the vehicle communication module 34 and/or the engine control module 36. For example only, the operating input may include a request for navigation directions that may be communicated to the vehicle communication system 34 to retrieve them from the host 20 (e.g. via GPS). Alternatively, for example only, the operating input may include depressing an accelerator (e.g. a pedal assembly) that may be communicated to the engine control module 36 to control a throttle (not shown).

Furthermore, the operator communication module 32 may receive display output from the vehicle communication module 34 and/or the engine control module 36. The operator communication module 32 may send the display output to vehicle display devices (not shown). For example only, the display output may include navigation directions that may be displayed on a navigation system screen (not shown). Alternatively, for example only, the display output may include a speed of the vehicle (i.e. a rotational speed of a transmission output shaft) that may be displayed on an instrument panel (not shown) of the vehicle 12.

The vehicle communication module 34 may establish a communication link between the vehicle 12 and the host 20 according to the systems and methods of the present disclosure. The engine control module 36 may communicate with actuators and/or sensors of an engine (not shown). For example only, the actuators may include a throttle valve and the sensors may include a throttle position sensor (TPS), which may collectively be used to control the throttle, as previously described.

Figure 3:
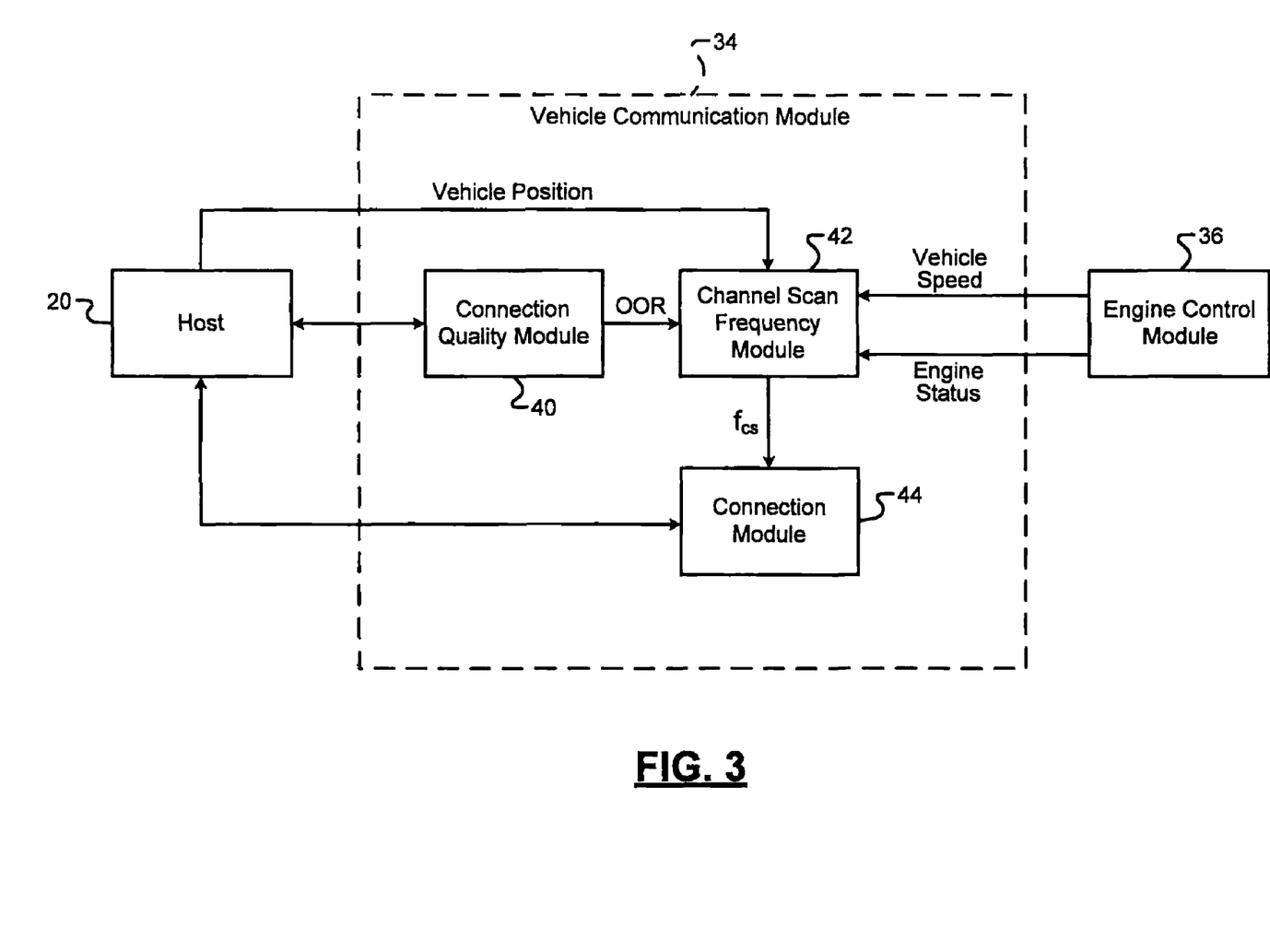
FIG. 3 is a functional block diagram of a vehicle communication module according to the present disclosure.

Referring now to FIG. 3, the vehicle communication module 34 is shown in more detail. The vehicle communication module 34 may include a connection quality module 40, a channel scan frequency module 42, and a connection module 44. The vehicle communication module 34 may communicate with the host 20 and the engine control module 36, as previously described.

The connection quality module 40 communicates with the host 20. The connection quality module 40 determines a quality of a communication link between the vehicle communication module 34 and the host 20. The connection quality module 40 may generate an out-of-range (OOR) signal based on the determined quality of the communication link. For example only, the connection quality module 40 may generate the OOR signal when the determined quality of the communication link is less than a predetermined threshold.

The channel scan frequency module 42 may receive the OOR signal from the connection quality module 40. The channel scan frequency module 42 may also receive a vehicle position signal from the host 20 that corresponds to global position of the vehicle 12. For example only, when the vehicle 12 is OOR the vehicle position signal may correspond to a most recent connection to the host 20. In other words, when the vehicle 12 is OOR from the host 20 a current vehicle position signal may not be obtainable, and thus a most recent vehicle position signal may be used.

The channel scan frequency module 42 may further receive a vehicle speed signal and a engine status signal from the engine control module 36. The vehicle speed signal may correspond to a current speed of the vehicle 12. For example only, the vehicle speed signal may be based on a rotational speed of a transmission output shaft. The engine status signal may correspond to whether the engine (not shown) is on. For example only, the engine status signal may be based on whether the engine has been started (i.e. ignited).

The channel scan frequency module 42 may generate a channel scan frequency ($f_{cs}$) based on at least one of the OOR signal, the engine status signal, the vehicle position signal, and the vehicle speed signal. The channel scan frequency $f_{cs}$ may correspond to a time interval between connection attempts by the connection module 44 to connect the host 20. For example only, when the OOR signal is low (i.e. the vehicle is in-range, or connected), the channel scan frequency $f_{cs}$ may not be generated (i.e. set to zero) because a connection attempt is not required.

However, when the OOR signal is high (i.e. the vehicle is OOR, or disconnected), the channel scan frequency module 42 may generate the channel scan frequency $f_{cs}$. For example only, the channel scan frequency module 42 may output a predetermined channel scan frequency corresponding to an average channel scan frequency (i.e. a base frequency). However, the channel scan frequency module 42 may also increase (up to a maximum frequency) or decrease (down to a minimum frequency) the channel scan frequency $f_{cs}$ relative to the base channel scan frequency.

The channel scan frequency module 42 may decrease the channel scan frequency $f_{cs}$ when the engine status signal is low (engine-off). For example, the channel scan frequency module 42 may decrease the channel scan frequency $f_{cs}$ to the minimum channel scanning frequency when the engine is off. For example only, the minimum channel scanning frequency may be 1/600 Hz (e.g. 1 scan per 10 minutes). A lower channel scanning frequency during an engine-off event may result in reduced power consumption.

Conversely, the channel scan frequency module 42 may also increase the channel scan frequency $f_{cs}$ when the engine status signal is high (engine-on). For example, the channel scan frequency module 42 may increase the channel scan frequency $f_{cs}$ to the maximum channel scan frequency when the engine is on. For example only, the predetermined frequency may be 1/20 Hz (e.g. 3 scans per minute). A higher channel scanning frequency during an engine-on event may improve connection speeds between the connection module 44 and the host 20. Furthermore, power savings may not be a concern when the engine is on and the vehicle 12 is not operating on battery power.

Furthermore, the channel scan frequency module 42 may generate a particular channel scan frequency $f_{cs}$ or increase/decrease the base channel scan frequency based on at least one of the vehicle speed signal and the vehicle position signal. For example, the channel scan frequency module 42 may generate a vehicle movement rate based on the vehicle speed signal and/or the vehicle position signal. For example only, the channel scan frequency module 42 may increase the channel scan frequency $f_{cs}$ when the vehicle movement rate is greater than a predetermined movement threshold. In other words, when the vehicle 12 is moving faster, more connection attempts may be required because of a constant changing position of the vehicle 12.

The connection module 44 receives the channel scan frequency $f_{cs}$ from the channel scan frequency module 42. The connection module 44 may attempt to establish a connection with the host 20 according to the channel scan frequency $f_{cs}$. In other words, the channel scan frequency $f_{cs}$ may correspond to a time interval between connection attempts by the connection module 44 to connect the host 20.

Figure 4:
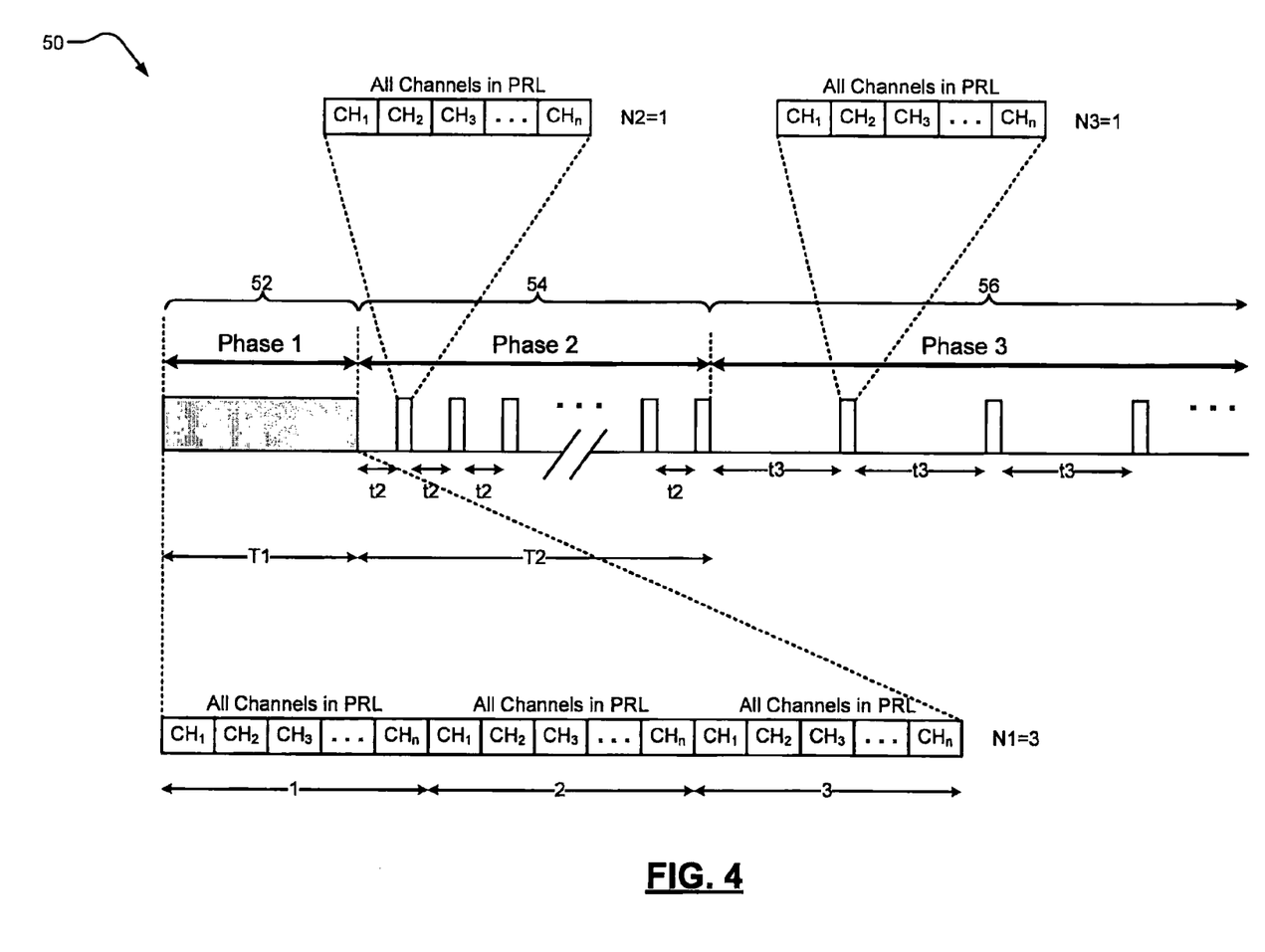
FIG. 4 is a timing diagram illustrating various channel scanning frequencies for engine-on and engine-off conditions.

Referring now to FIG. 4, a timing diagram 50 illustrating various channel scan frequencies $f_{cs}$ for both engine-on and engine-off conditions is shown. For example, Phase 1 52 may correspond to an engine-on, OOR event. In other words, Phase 1 52 may include continuously scanning through an entire preferred roaming list (PRL) database (i.e. the maximum channel scan frequency). For example, the PRL database may include information used during system selection and connection acquisition. During phase 1 52, the entire PRL database may be scanned N1 times during a time period T1. For example only, N1 may be 3 times and T1 may be 15 seconds.

Phase 2 54 may correspond to an engine-off, OOR event. In other words, Phase 2 54 may include intermittently scanning through the PRL database based on the channel scan frequency $f_{cs}$. Therefore, in between the scanning and/or connecting, Phase 2 54 includes "deep sleep" periods where power savings are improved.

During Phase 2 54, the entire PRL database may be scanned N2 times followed by a deep sleep period t2, repeated for the period T2 corresponding to Phase 2 54. For example only, N2 may be 1, t2 may be 20 seconds, and T2 may be 600 seconds.

Phase 3 56 may also correspond to an engine-off, OOR event. However, Phase 3 56 may include intermittently scanning through the PRL database based on a lesser channel scan frequency $f_{cs}$ than in Phase 2 54. In other words, the deep sleep periods in Phase 3 56 may be longer than those of Phase 2 54. For example only, Phase 2 54 may transition to Phase 3 56 when a the vehicle 12 has been OOR for longer than a predetermined time. In other words, Phase 3 56 may be implemented to maximize power savings.

During Phase 3 56, the entire PRL database may be scanned N3 times followed by a deep sleep period t3, repeated continuously (i.e. forever) until a connection is established or the system is reset. For example only, N3 may be 1 and t3 may be 300 seconds. In other words, for example only, Phase 3 56 may correspond to the minimum channel scan frequency $f_{cs}$.

Figure 5A:
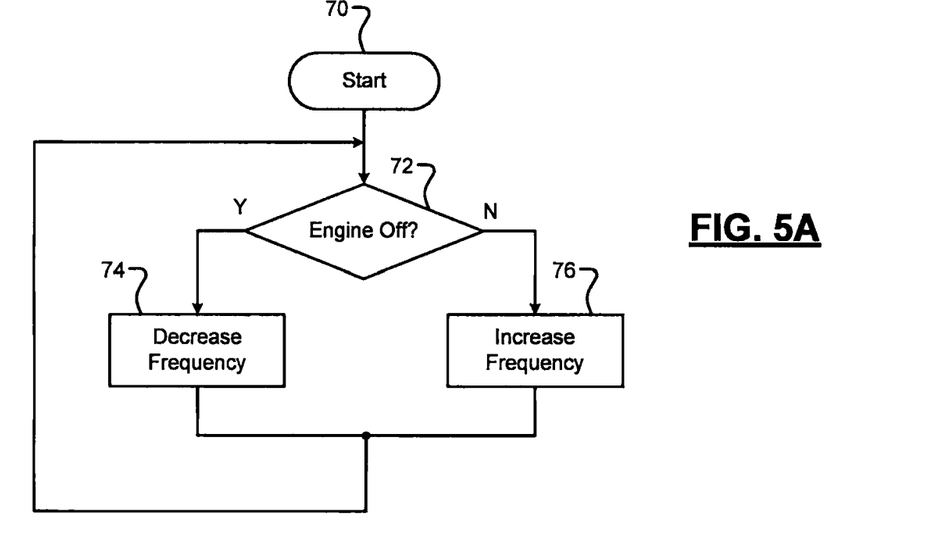
FIG. 5A is a flow diagram of a first method for controlling a channel scan frequency of the vehicle communication module according to the present disclosure.

Referring now to FIG. 5A, a first method for controlling the channel scan frequency $f_{cs}$ begins in step 70. In step 72, the channel scan frequency module 42 determines whether the engine is off. If yes, control may proceed to step 74. If no, control may proceed to step 76.

In step 74, the channel scan frequency module 42 may decrease the channel scan frequency $f_{cs}$ and control may return to step 72. For example, the channel scan frequency module 42 may decrease the channel scan frequency $f_{cs}$ relative to the base frequency. Furthermore, for example only, the channel scan frequency module 42 may decrease the channel scan frequency $f_{cs}$ to the minimum channel scan frequency.

In step 76, the channel scan frequency module 42 may increase the channel scan frequency $f_{cs}$ and control may return to step 72. For example, the channel scan frequency module 42 may increase the channel scan frequency $f_{cs}$ relative to the base frequency. Furthermore, for example only, the channel scan frequency module 42 may increase the channel scan frequency $f_{cs}$ to the maximum channel scan frequency.

Figure 5B:
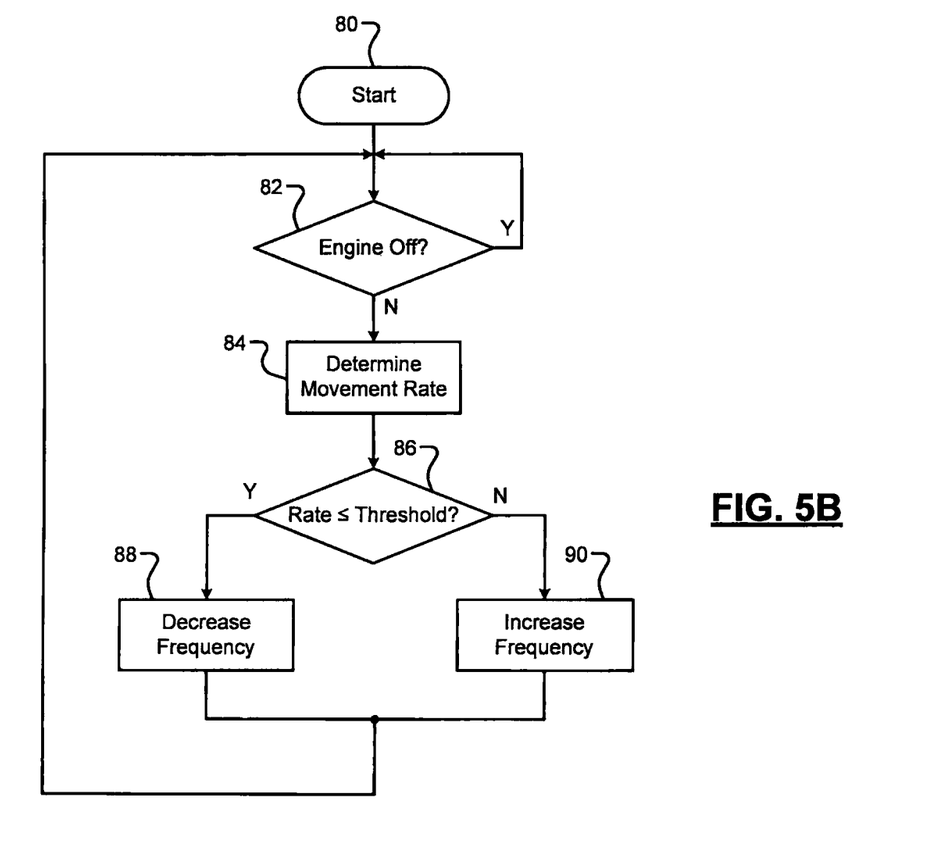
FIG. 5B is a flow diagram of a second method for controlling the channel scan frequency of the vehicle communication module according to the present disclosure.

Referring now to FIG. 5B, a second method for controlling the channel scan frequency $f_{cs}$ begins in step 80. In step 82, the channel scan frequency module 42 determines whether the engine is off. If yes, control may return to step 82. If no, control may proceed to step 84.

In step 84, the channel scan frequency module 42 may determine a movement rate of the vehicle 12. For example only, the channel scan frequency module 42 may determine the rate of movement of the vehicle 12 based on the vehicle position signal from the host 20 (i.e. from a most recent connection) and/or the vehicle speed signal from the engine control module 36.

In step 86, the channel scan frequency module 42 may compare the movement rate of the vehicle 12 to a predetermined movement rate threshold. When the movement rate of the vehicle 12 is less than or equal to the predetermined movement rate threshold (i.e. the vehicle 12 is approximately stationary), control may proceed to step 88. If no, control may proceed to step 90.

In step 88, the channel scan frequency module 42 may decrease the channel scan frequency $f_{cs}$ and control may return to step 82. For example, the channel scan frequency module 42 may decrease the channel scan frequency $f_{cs}$ relative to the base frequency. Furthermore, for example only, the channel scan frequency module 42 may decrease the channel scan frequency $f_{cs}$ to the minimum channel scan frequency.

In step 90, the channel scan frequency module 42 may increase the channel scan frequency $f_{cs}$ and control may return to step 82. For example, the channel scan frequency module 42 may increase the channel scan frequency $f_{cs}$ relative to the base frequency. Furthermore, for example only, the channel scan frequency module 42 may increase the channel scan frequency $f_{cs}$ to the maximum channel scan frequency.

Figure 6:
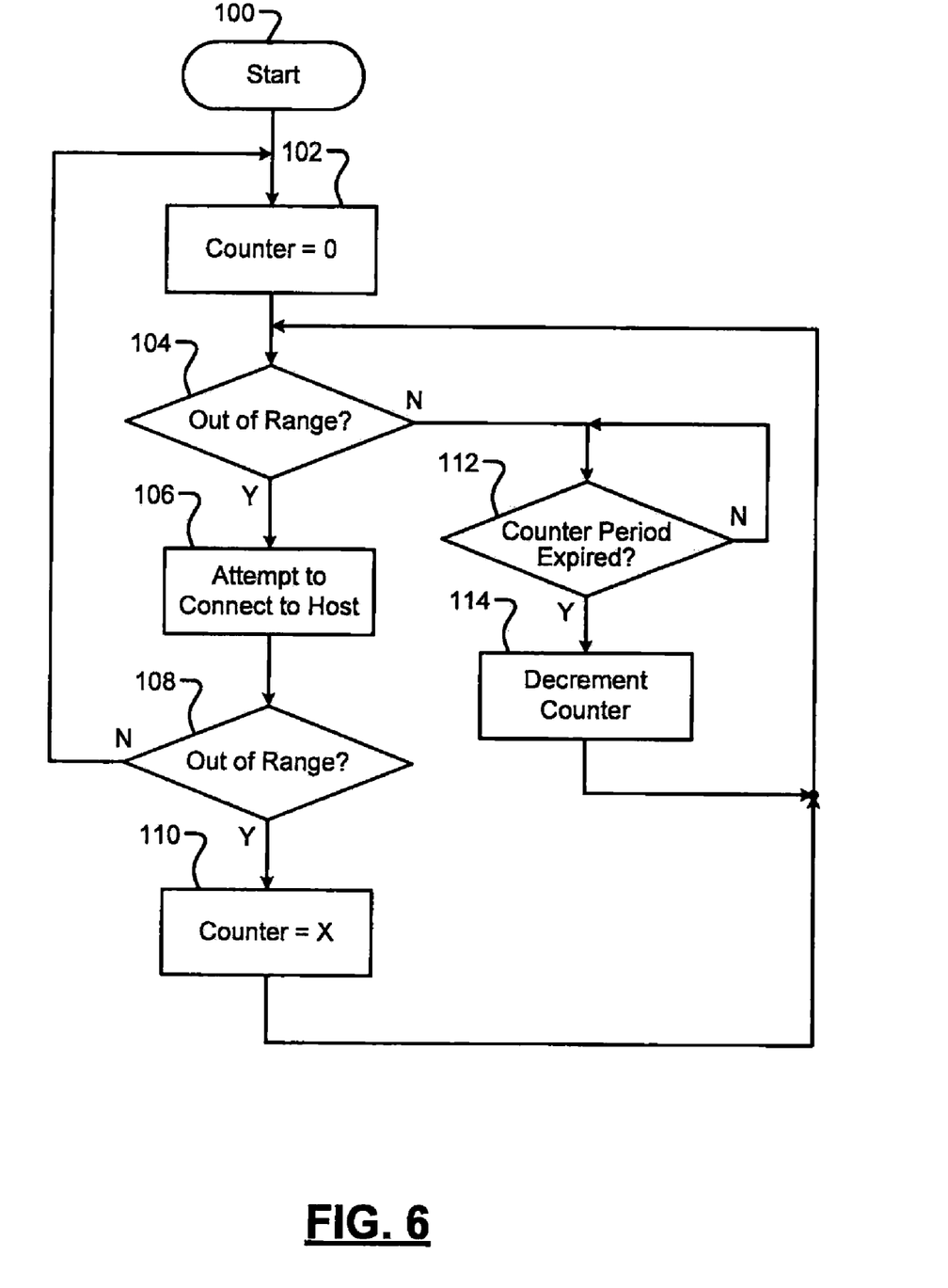
FIG. 6 is a flow diagram of a method for controlling the vehicle communication module according to the present disclosure.

Referring now to FIG. 6, a method of controlling the vehicle communication module 34 begins in step 100. In step 102, the vehicle communication module 34 sets a connection attempt count to zero.

In step 104, the vehicle communication module 34 determines whether the vehicle 12 is OOR from the host 20 (i.e. disconnected). If yes, control may proceed to step 106. If no, control may proceed to step 112.

In step 106, the vehicle communication module 34 may attempt to connect to the host 20. In step 108, the vehicle communication module 34 may again determine whether the vehicle is OOR from the host 20 (i.e. disconnected). If yes, control may proceed to step 110. If no, control may return to step 102 and the connection attempt counter may be set to zero (i.e. reset due to the recent successful connection).

In step 110, the vehicle communication module 34 may set the connection attempt counter to a predetermined counter threshold X. For example only, the predetermined counter threshold X may correspond to a maximum number of connection attempts that may be made running only on battery power during an engine-off, OOR event. Alternatively, the predetermined counter threshold X may correspond to a particular channel scan frequency $f_{cs}$. Control may then return to step 104.

In step 112, the vehicle communication module 34 may wait for a predetermined counter period to expire. For example only, the predetermined counter period may correspond to the channel scan frequency $f_{cs}$. In other words, the predetermined counter period may be the inverse of the channel scan frequency $f_{cs}$ (e.g. $1/f_{cs}$), which corresponds to a time interval (e.g. time=1/frequency). When the predetermined counter period has expired, control may proceed to step 114.

In step 114, the connection attempt counter may be decremented and control may return to step 104. In other words, the vehicle communication module 34 may wait for the predetermined counter period in between connection attempts in order to save power. Additionally, for example only, when the connection attempt counter is decremented below zero, the vehicle communication module 34 may stop further connection attempts due to critically low power in the battery.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle communication system, comprising:
  a connection quality module that determines that a vehicle is out-of-range (OOR) from a host when a connection quality between the vehicle and the host is below a predetermined connection quality threshold; and
  a channel scan frequency module that controls a frequency of attempts by the vehicle to connect to the host when the vehicle is OOR based on at least one of whether an engine is on and a movement rate of the vehicle.

2. The vehicle communication system of claim 1, further comprising:
  a connection module that at least one of attempts to connect the vehicle to the host and connects the vehicle to the host based on the frequency, wherein the connection module communicates with the host through radio frequency (RF) communication.

3. The vehicle communication system of claim 1, wherein the channel scan frequency module decreases the frequency relative to a predetermined base frequency when the engine is off.

4. The vehicle communication system of claim 3, wherein channel scan frequency module increases the frequency relative to the predetermined base frequency when the engine is on.

5. The vehicle communication system of claim 1, wherein the channel scan frequency module sets the frequency to a predetermined minimum frequency when the engine is off.

6. The vehicle communication system of claim 5, wherein the channel scan frequency module sets the frequency to the predetermined minimum frequency when the vehicle movement rate is less than or equal to a predetermined minimum movement rate threshold.

7. The vehicle communication system of claim 1, wherein the channel scan frequency module sets the frequency to a predetermined maximum frequency when the engine is on.

8. The vehicle communication system of claim 7, wherein the channel scan frequency module sets the frequency to the predetermined maximum frequency when the vehicle movement rate is greater than or equal to a predetermined maximum movement rate threshold.

9. The vehicle communication system of claim 1, wherein the movement rate of the vehicle is based on a speed of the vehicle.

10. The vehicle communication system of claim 1, wherein the movement rate of the vehicle is based on two or more global positions of the vehicle.

11. A method for connecting a vehicle to a host, comprising:
  determining that the vehicle is out-of-range (OOR) from the host when a connection quality between the vehicle and the host is below a predetermined connection quality threshold; and
  controlling a frequency of attempts by the vehicle to connect to the host when the vehicle is OOR based on at least one of whether an engine is on and a movement rate of the vehicle.

12. The method of claim 11, further comprising:
  at least one of attempting to connect the vehicle to the host and connecting the vehicle to the host based on the frequency, wherein the at least one of attempting to connect to the host and connecting to the host is through radio frequency (RF) communication.

13. The method of claim 11, further comprising:
  decreasing the frequency relative to a predetermined base frequency when the engine is off.

14. The method of claim 13, further comprising:
  increasing the frequency relative to the predetermined base frequency when the engine is on.

15. The method of claim 11, further comprising:
  setting the frequency to a predetermined minimum frequency when the engine is off.

16. The method of claim 15, further comprising:
  setting the frequency to the predetermined minimum frequency when the vehicle movement rate is less than or equal to a predetermined minimum movement rate threshold.

17. The method of claim 11, further comprising:
  setting the frequency to a predetermined maximum frequency when the engine is on.

18. The method of claim 17, further comprising:
  setting the frequency to the predetermined maximum frequency when the vehicle movement rate is greater than or equal to a predetermined maximum movement rate threshold.

19. The method of claim 11, wherein the movement rate of the vehicle is based on a speed of the vehicle.

20. The method of claim 11, wherein the movement rate of the vehicle is based on two or more global positions of the vehicle.

* * * * *